(12) United States Patent
Minami et al.

(10) Patent No.: US 6,582,286 B2
(45) Date of Patent: Jun. 24, 2003

(54) END FACE POLISHING APPARATUS

(75) Inventors: Koji Minami, Chiba (JP); Katsuaki Kita, Tokyo (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/783,879

(22) Filed: Feb. 15, 2001

(65) Prior Publication Data

US 2001/0023164 A1 Sep. 20, 2001

(30) Foreign Application Priority Data

Mar. 13, 2000 (JP) ........................................ 2000-069276

(51) Int. Cl.⁷ .............................. B24B 7/00; B24B 9/00
(52) U.S. Cl. .................. 451/270; 451/277; 451/384; 451/390
(58) Field of Search ............................ 451/41, 42, 285, 451/287, 288, 270, 277, 272, 273, 274, 384, 385, 390, 389, 397, 398

(56) References Cited

U.S. PATENT DOCUMENTS

| 4,831,784 | A | * | 5/1989 | Takahashi | 451/270 |
| 4,979,334 | A | * | 12/1990 | Takahashi | 451/271 |
| 5,184,433 | A | * | 2/1993 | Maack | 451/162 |
| 5,458,531 | A | * | 10/1995 | Matsuoka et al. | 451/270 |
| 5,464,361 | A | * | 11/1995 | Suzuki et al. | 451/28 |
| 6,110,013 | A | * | 8/2000 | Minami et al. | 451/41 |

* cited by examiner

*Primary Examiner*—Timothy V. Eley
(74) *Attorney, Agent, or Firm*—Adams & Wilks

(57) ABSTRACT

An end face polishing apparatus has a jig plate for supporting at least one workpiece having an end face and a polishing member for polishing the end face of the workpiece. A support mechanism supports the jig plate to undergo movement in a direction toward the polishing member to bring the end face of the workpiece into pressure contact with the polishing member solely under the weight of the jig plate.

25 Claims, 7 Drawing Sheets

END FACE POLISHING APPARATUS

BACKGROUND OF THE INVENTION

1. Field of the Invention

The present invention relates to an end face polishing apparatus for polishing end faces of rod-shaped members of optical communication fibers and the like.

2. Description of the Related Art

An optical communication fiber is used after it has been adhered and fixed to a center hole of a ferrule which is a main member of a connector, and then an end face of the ferrule and an end face of a fiber are simultaneously smoothly polished to become a mirror surface. If the polished surfaces of the ferrule and the fiber thus polished are not vertical to a center axis of the ferrule, or the polished surfaces have damages, the optical connector having ferrules oppositely connected with each other is deteriorated in accuracy at the opposite position, resulting in an increase in loss. Therefore, the polished surface of a ferrule including an optical fiber requires finishing of the polished surface with high accuracy.

As a conventional optical fiber end face polishing apparatus, for example, there is one disclosed in Japanese Patent Application Laid-open No. Hei 3-26456. The optical fiber end face polishing apparatus disclosed in this publication has an eccentric plate which rotates on a concentric circle of a self-rotation disc, and has a planetary gear which transmits rotation of a motor for revolution to this eccentric plate, and this eccentric plate is combined with a polishing plate to cause the polishing plate to self-rotate and revolve. The plurality of the end-faces of the ferrule held by a jig plate are pressed to the polishing member fixed to the polishing plate, and the end faces of the ferrules are polished.

SUMMARY OF THE INVENTION

As described above, the conventional optical fiber end face polishing apparatus conducts polishing by pressing with spring and the like the end faces of a plurality of ferrules held by the jig plate to the polishing member fixed to the self-rotating and revolving polishing plate. There is no problem if the number of ferrules mounted on the jig plate are always the same. However, if a jig plate which may normally hold a plurality of ferrules (6 to 12) instead holds a few number of ferrules (3 to 4), the variation in the load added to one ferrule becomes large, thereby increasing the variation of the size of the end face shape R. Further, in a case that the load is controlled by adjusting the force of the spring, it is required to decrease the adjustment error of the spring force by mechanical control which may be difficult to accomplish.

The object of the present invention, in view of the above, is to provide an end face polishing apparatus which may polish while adding a certain load on the ferrule when polishing the end face of the ferrule.

To solve the above object, according to a first aspect of the present invention, an end face polishing apparatus has a rod-shaped member mounted on a jig plate by a polishing member mounted on the polishing plate which is rotatably and swingably supported to the apparatus body. The jig plate is supported in a state where rotation is regulated, and is provided with at least the mounting portion of the rod-shaped member movable in the vertical direction and is supported to the jig plate by the tip end of the rod-shaped member.

According to a second aspect of the present invention, in a first aspect of the invention, an end face polishing apparatus is characterized in that the jig plate is supported movably in the vertical direction by the support mechanism, and the mounting portion of the rod-shaped member is provided integrally with the peripheral portion of the jig plate.

According to a third aspect of the present invention, in the second aspect of the invention, an end face polishing apparatus is characterized in that the jig plate is formed with a through hole or a recessed groove in the center, whereas the support mechanism has a support shaft that may be inserted or fitted to the through hole or the recessed groove, and both are engaged movably in the vertical direction.

According to a fourth aspect of the present invention, in the third aspect of the invention, an end face polishing apparatus is characterized in that the through hole or the recessed groove and the support shaft are engaged to restrict the rotation of the jig plate with the support shaft as the center.

According to a fifth aspect of the present invention, in the third or fourth aspect of the invention, an end face polishing apparatus is characterized in that the engaging portion formed with the through holes and recessed grooves of the jig plate is exchangeable, in which by exchanging with a pressurizing engaging portion having a recess portion at the apex portion for receiving the tip end of the support shaft, the jig plate is pressurized by the support shaft downwards with a predetermined pressure.

According to a sixth aspect of the present invention, in the first aspect of the invention, an end face polishing apparatus is characterized in that the jig plate is supported by the support mechanism, and the mounting portion of the rod-shaped member is supported to the jig plate movably in the vertical direction.

In the end face polishing apparatus of the present invention, by the weight of the jig plate, a certain load may always be applied to the rod-shaped member. Further, since the load is applied by the weight of the jig plate, the structure of the apparatus can be simplified. Further, since polishing can be conducted by applying a certain load to the rod-shaped member, the accuracy of the shape of the polishing surface can be improved.

DETAILED DESCRIPTION OF THE PREFERRED EMBODIMENTS

The embodiments of the present invention are explained below referring to the figures.

Embodiment 1

Figure 1:
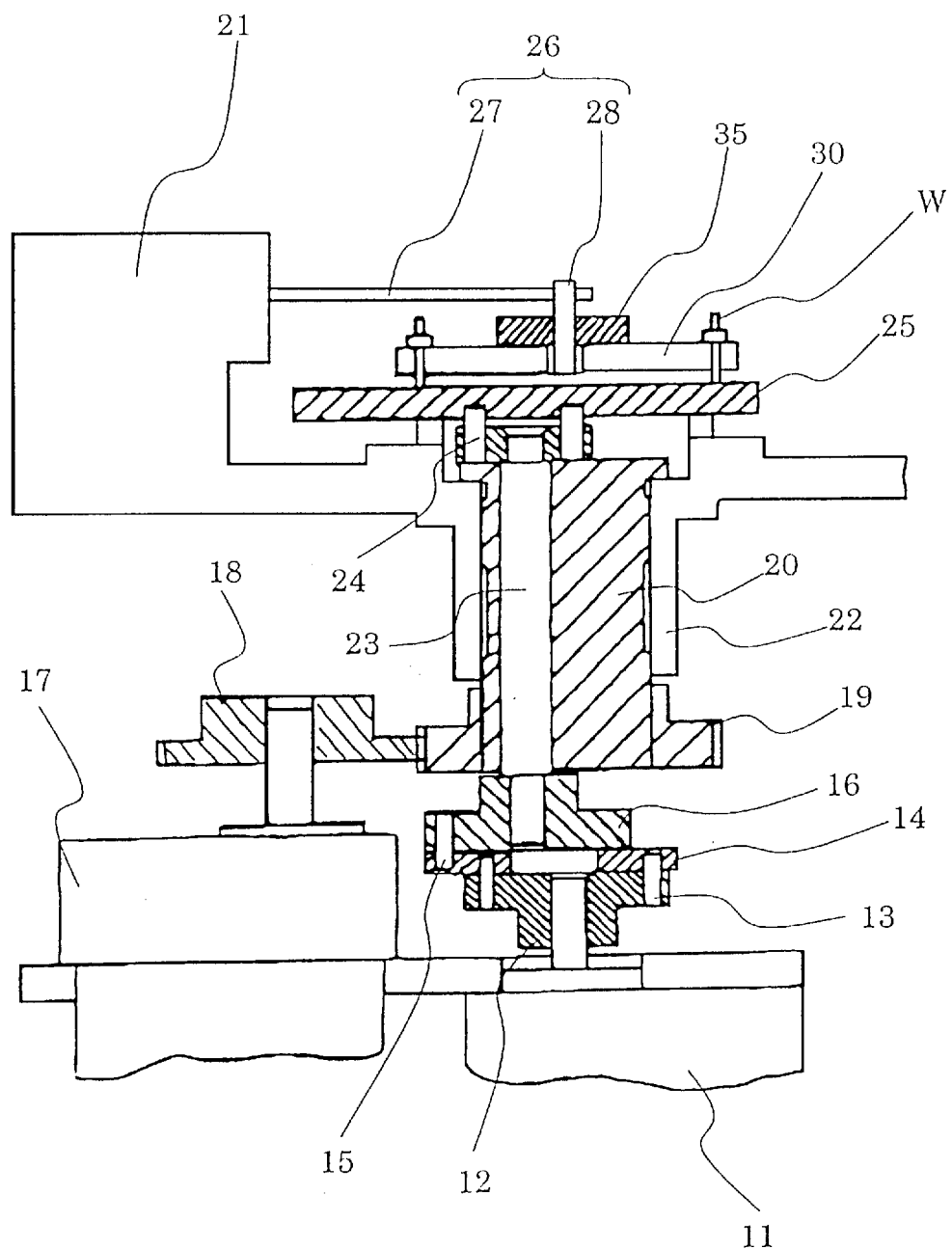
FIG. 1 is a part of across sectional view of an end face polishing apparatus according to Embodiment 1 of this invention.
Figure 2:
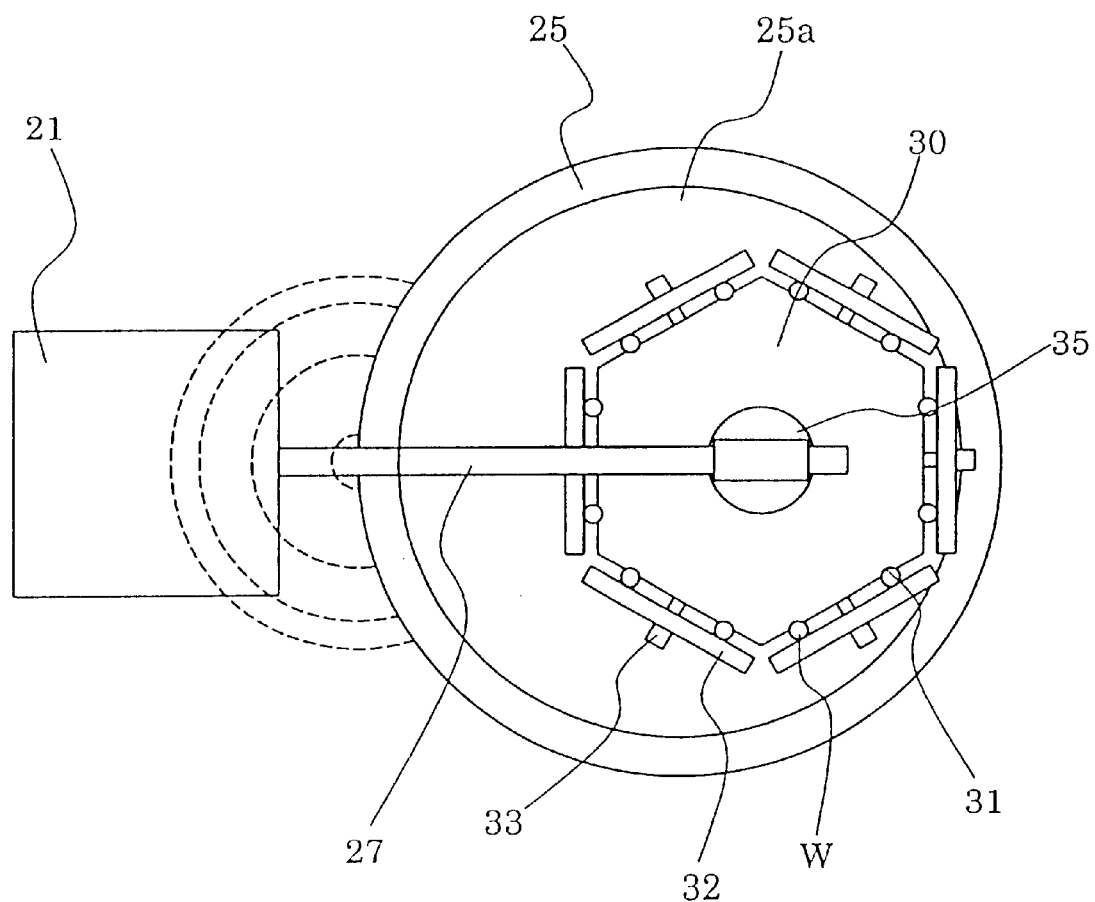
FIG. 2 is a top view of an end face polishing apparatus according to Embodiment 1 of this invention.
Figure 3:
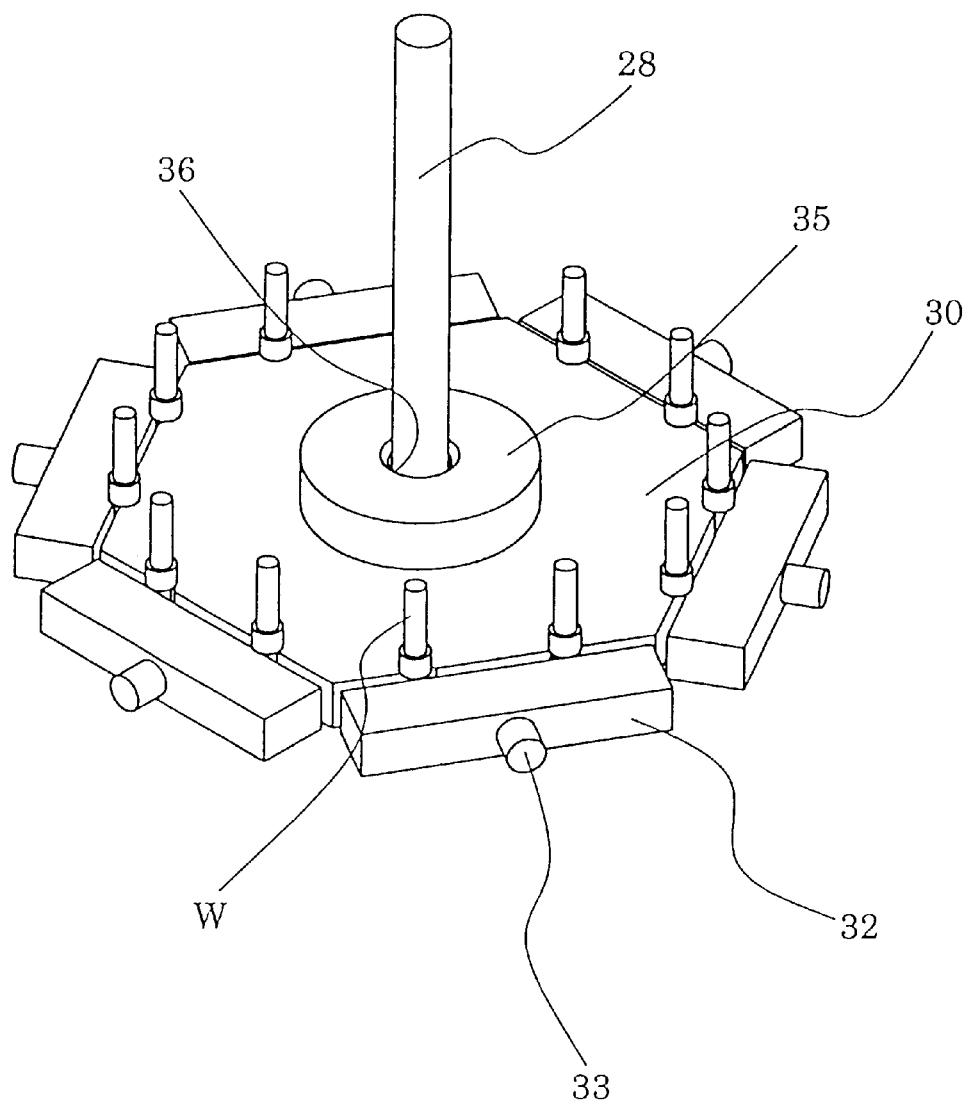
FIG. 3 is a perspective view of a jig plate according to Embodiment 1 of this invention.
Figure 4A:
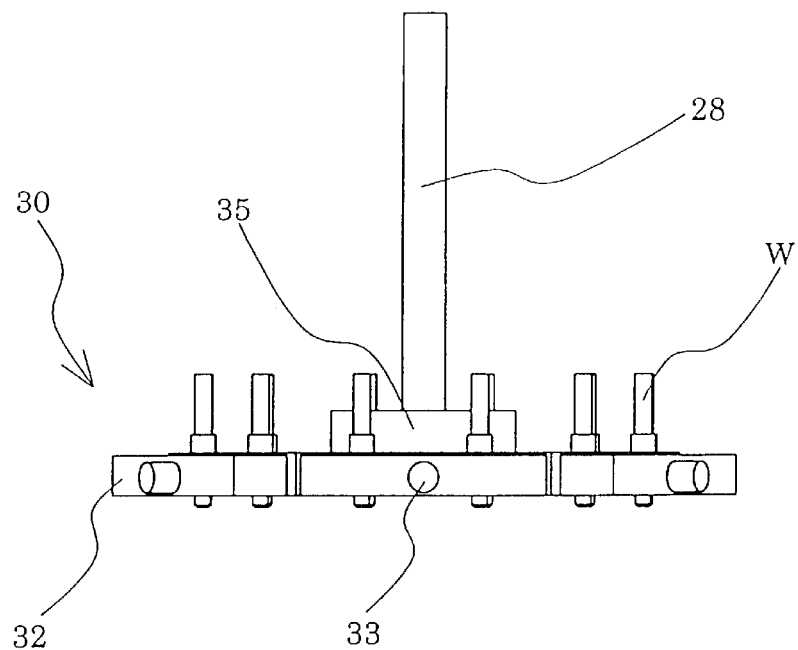
FIGS. 4A and 4B are, respectively, a front view and a cross sectional view of a jig plate according to Embodiment 1 of this invention.
Figure 4B:
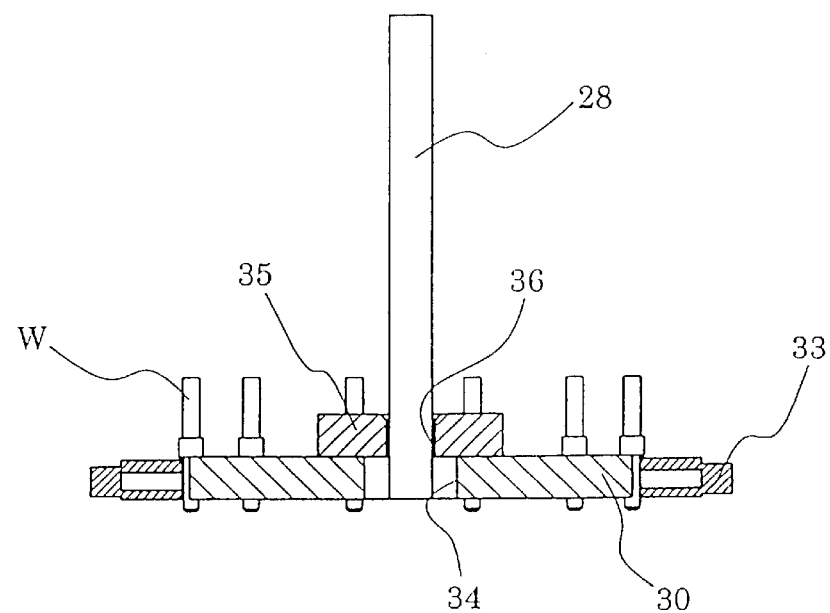

FIG. 1 is a part of a cross sectional view of an end face polishing apparatus of an embodiment of this invention. FIG. 2 is a top view of an end face polishing apparatus, FIG. 3 is a perspective view of a jig plate, and FIGS. 4A and 4B are a top view and a cross section view of a jig plate, respectively.

As shown in FIGS. 1 and 2, the rotating shaft of a motor 11 for self-rotation is firmly fixed to the center portion of a first self-rotation transmitting plate 12, and on the first self-rotation transmitting plate 12 a plurality of first coupling pins 13 are fixed on the concentric circle with the rotation center as a fulcrum. Then, the respective first coupling pins 13 are coupled rotatably to the eccentric portion of the corresponding respective rotation transmitting plates 14. The eccentric portion of the respective rotation transmitting plates 14 are fixed with second coupling pins 15. The respective second coupling pins 15 are coupled to a second self-rotation transmitting plate 16.

On the other hand, the rotating shaft of a motor 17 for revolution is firmly fixed with a center potion of a driving gear 18, and the driving gear 18 engages with a following gear 19. The follower gear 19 is firmly fixed to a periphery of the lower portion of a revolution transmitting shaft 20, and around the periphery of the upper portion of the revolution transmitting shaft 20 is fitted a bearing cylinder portion 22 of the apparatus body 21. Then, the revolution transmitting shaft 20 is rotatably fitted with a rotating shaft 23 for self-rotation in a position that is eccentric by a predetermined amount from the rotation center, and the lower end portion of the rotating shaft 23 for self-rotation is fixed to the center portion of the second self-rotation transmitting plate 16.

Further, the upper end portion of the rotating shaft 23 for self-rotation is connected to a polishing plate 25 with the coupling member 24, and further a polishing member 25a is provided on the upper surface portion of the polishing plate 25.

On the other hand, on the apparatus body is supported a jig plate 30 fixed with a plurality of workpieces or rod-shaped members W, such as ferrules, by a support mechanism 26.

Next, the support mechanism 26 and the jig plate 30 will be explained in detail.

As shown in FIGS. 1 and 2, the support mechanism 26 comprises a support arm portion 27, the cross section of which is rectangular in shape, extending horizontally from the apparatus body too the center of the polishing plate 25, and a support shaft 28 provided towards the polishing plate from the tip end of the support arm portion 27.

On the other hand, the jig plate 30 is hexagonal in a plan view, and is provided with mounting pieces 32 opposite a plurality of V grooves 31 formed in the peripheral portion. In between the mounting pieces 32 and the V grooves 31, the rod-shaped member W is sandwiched to fix the mounting pieces 32 with the fixing screws 33, thereby detachably fixing the rod-shaped member W to the jig plate 30.

Further, as shown in FIGS. 3 and 4, in the upper surface center portion of the jig plate 30 is provided a boss portion 35, at the center of which an insertion hole 36 penetrated in the direction of the thickness of the boss portion 35 is provided so the support shaft 28 is insertable. The boss portion 35 is fixed detachably to restrict the movement of the rotation direction.

The jig plate 30 is provided with through holes 34 in the thickness direction of the boss portion 35 through the insertion hole 36. By inserting the support shaft into the through hole 34 and insertion hole 36 of the boss portion 35 of the jig plate, the jig plate 30 is held movably in the axial direction of the support shaft 28 in a state opposing the polishing member 25a, and is supported on the polishing plate 25 by the tip end portion of the rod-shaped member W fixed by the mounting pieces 32. For reference, the insertion hole 36 is not always penetrated, and it may be formed in the shape of convex groove coupling to the tip end portion of the support shaft 28.

Further, the movement in the rotation direction of the jig plate 30 is restricted. The structure that restricts the rotation direction is not particularly limited. For example, the support shaft 28 may be a shape where the cross section is rectangular, to restrict the movement of the rotation direction by having the through holes 34 of the jig plate 30 to be rectangular, or an engaging arm which engages to the periphery of the jig plate 30 may be extendedly provided from the support arm 27.

In such a jig plate 30, the tip end face of the rod-shaped member W fixed by mounting pieces 32 is press-contacted to the polishing member 25a by the own weight of the jig plate 30.

In such a structure, since polishing can be carried out with a constant pressure by the weight of the jig plate 30 itself, regardless of the progress of the polishing of the rod-shaped member W, the R shape accuracy of the tip end face of the rod-shaped member W may be improved. Further, since the polishing amount is proportional to the polishing time, management of the accuracy and management of the polishing time may be easily conducted. Further, since the jig plate 30 is utilized to press using its own weight, there is no need to adjust pressure unlike when pressure added mechanically by a spring or the like.

Note that, even if a conventional mechanical pressing means such as a spring is provided in the end face polishing apparatus, by just replacing the boss portion 35, it may become a pressure type end face polishing apparatus.

Figure 7:
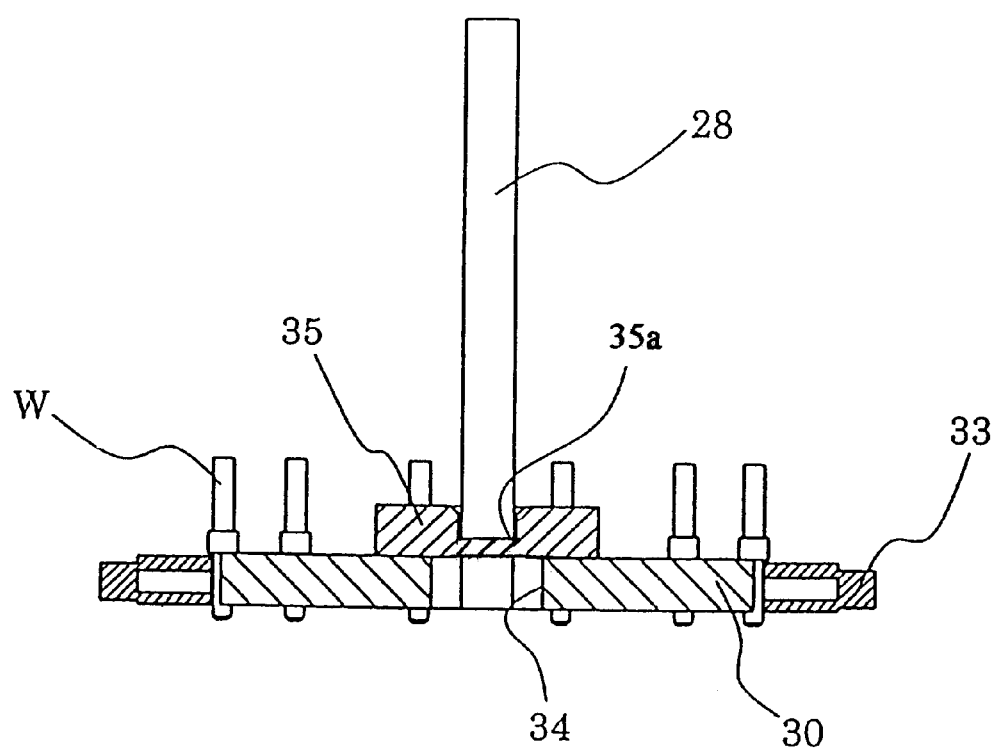
FIG. 7 is a partial cross-sectional view of a jig plate according to another embodiment of the present invention.

FIG. 7 shows another embodiment which differs from the embodiment shown in FIG. 4B in that the boss portion 35 comprises an engaging portion having a recessed groove 35a. The support shaft 28 has an end extending into the recessed groove 35a.

Next, the operation of the end face polishing apparatus in the embodiment above will be explained.

As shown in FIGS. 1 and 2, first, in a revolving movement, the revolution transmitting shaft 20 is rotated through the gears 18 and 19 by driving the motor 17 for revolution, to rotate the polishing plate 25 in a revolving motion by a predetermined eccentric amount. In this case, the rotating shaft 23 for self-rotation is in the revolution transmitting shaft 20. In between this and the first self-rotation transmitting plate 12 a plurality of rotation transmitting plates 14 are arranged, so that the rotation transmitting plates 14 rotate respectively in the same phase as the revolution transmitting shaft 20 around the first coupling pins 13. Accordingly, even if the first self-rotation transmitting plate 12 is stopped, or is rotating, the rotation of the revolution transmitting shaft 20 will not be restricted.

On the other hand, as to the self-rotation motion, by driving the self-rotation motor 11, the first self-rotation transmitting plate 12 is rotated. Since the first coupling pin 13 is on a concentric circle of the first self-rotation transmitting plate 12, it traces the same locus mentioned above. Although the rotating shaft 23 for self-rotation is rotated by a predetermined eccentric amount, since it is coupled by the rotation transmitting plate 14, a rotation of the same rotation number as that of the first self-rotation transmitting plate 12 is transmitted to the rotating shaft 23 for self-rotation.

In this way, the polishing plate 25 revolves while self-rotating by the rotation movement of the revolution transmitting shaft 20 and the rotating shaft 23 for self-rotation. On the other hand, since the jig plate 30 is held movable in the axial direction to the support shaft 28, the respective rod-shaped members W is pressed at the end face to the polishing member 25a by the own weight of the jig plate 30.

In this case, the rod-shaped member W is pressed to the polishing member 25a by the constant pressure regardless of the progress of polishing so that the end face of the rod-shaped member W is processed to be an ideal convex spherical surface.

Embodiment 2

Figure 5:
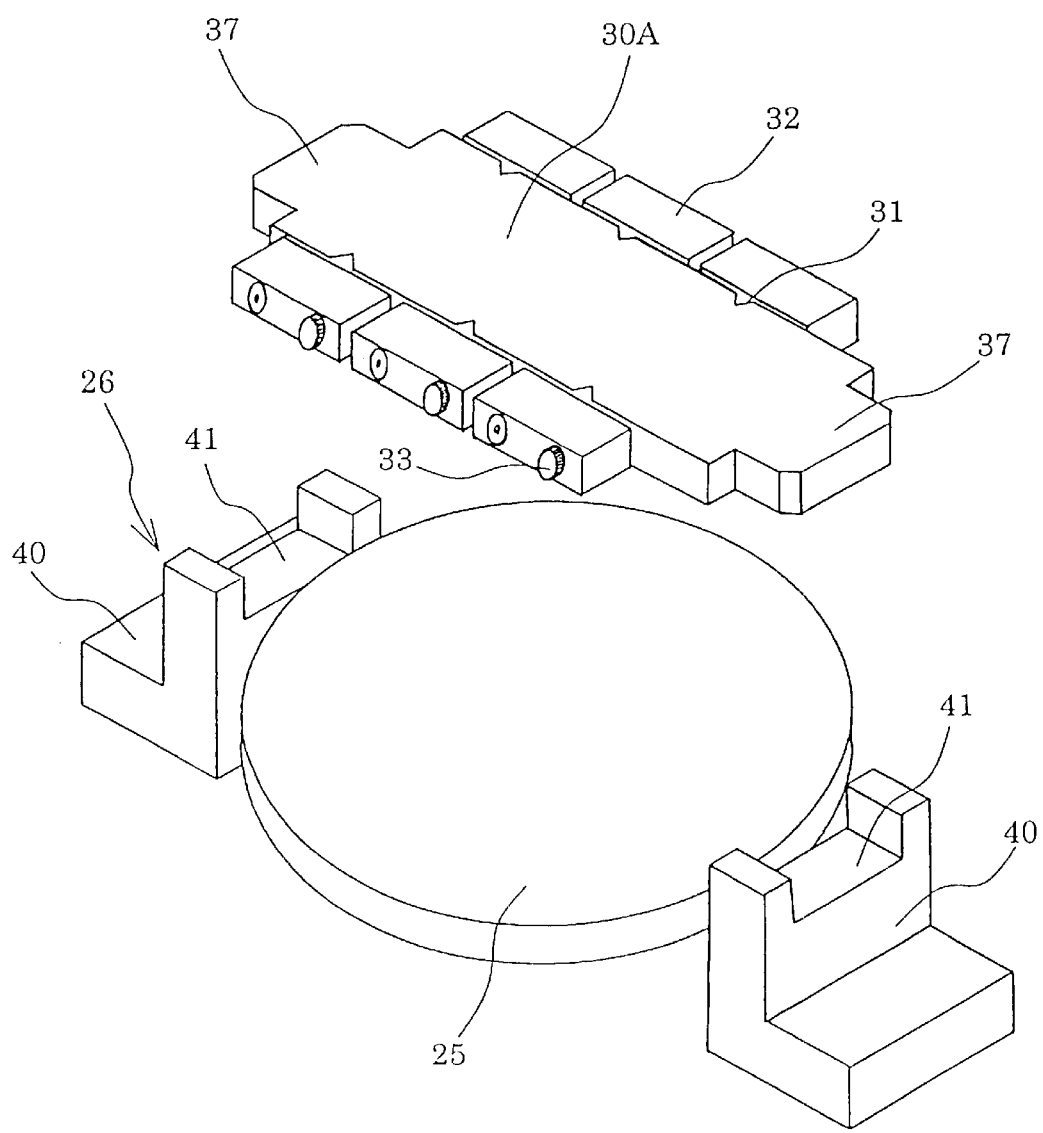
FIG. 5 is a schematic perspective view of a jig plate and a polishing plate according to Embodiment 2 of this invention.

FIG. 5 is a perspective view of a jig plate and a support mechanism according to Embodiment 2 of this invention. Further, members that have similar functions as those in the embodiment described above have the same reference numerals and explanation is omitted.

As shown in FIG. 5, the jig plate 30A of this embodiment is rectangular in shape, and on one of the opposing surfaces, are V grooves 31 for holding the rod-shaped members W and mounting pieces 32. On both ends of the jig plate 30A in the longitudinal direction are extendedly provided narrow width portions 37 with narrow widths.

In a support mechanism 26 which supports such a jig plate 30A, is comprised of a pair of base stands 40 provided sandwiching the polishing plate 25, and on the upper portion of this base block 40 is provided an engaging groove 41 to engage with the narrow width portion 37. By engaging a narrow width portion 37 with this engaging groove 41, the jig plate 30A is held movably in a vertical and horizontal direction in a state where the rotation direction movement of the jig plate 30A is restricted, and is supported on the polishing plate 25 through the tip end portion of the rod-shaped member W fixed by the mounting pieces 32.

With such a structure, the jig plate 30A can polish the rod-shaped member W always with a uniform load. Therefore, the polishing accuracy of the rod-shaped member W may be improved.

Other Embodiments

The embodiments of this invention have been described above, but the fundamental structure of the end face polishing apparatus is not limited to that described above.

For example, the jig plates 30 and 30A are held movable in the vertical direction in the above described Embodiments 1 and 2, but it is not limited to this, and as a different structure of the holding mechanism for holding the rod-shaped member W of the jig plate, the jig plate may be held movable in the vertical direction with just the rotation direction movement of the holding mechanism restricted.

Figure 6:
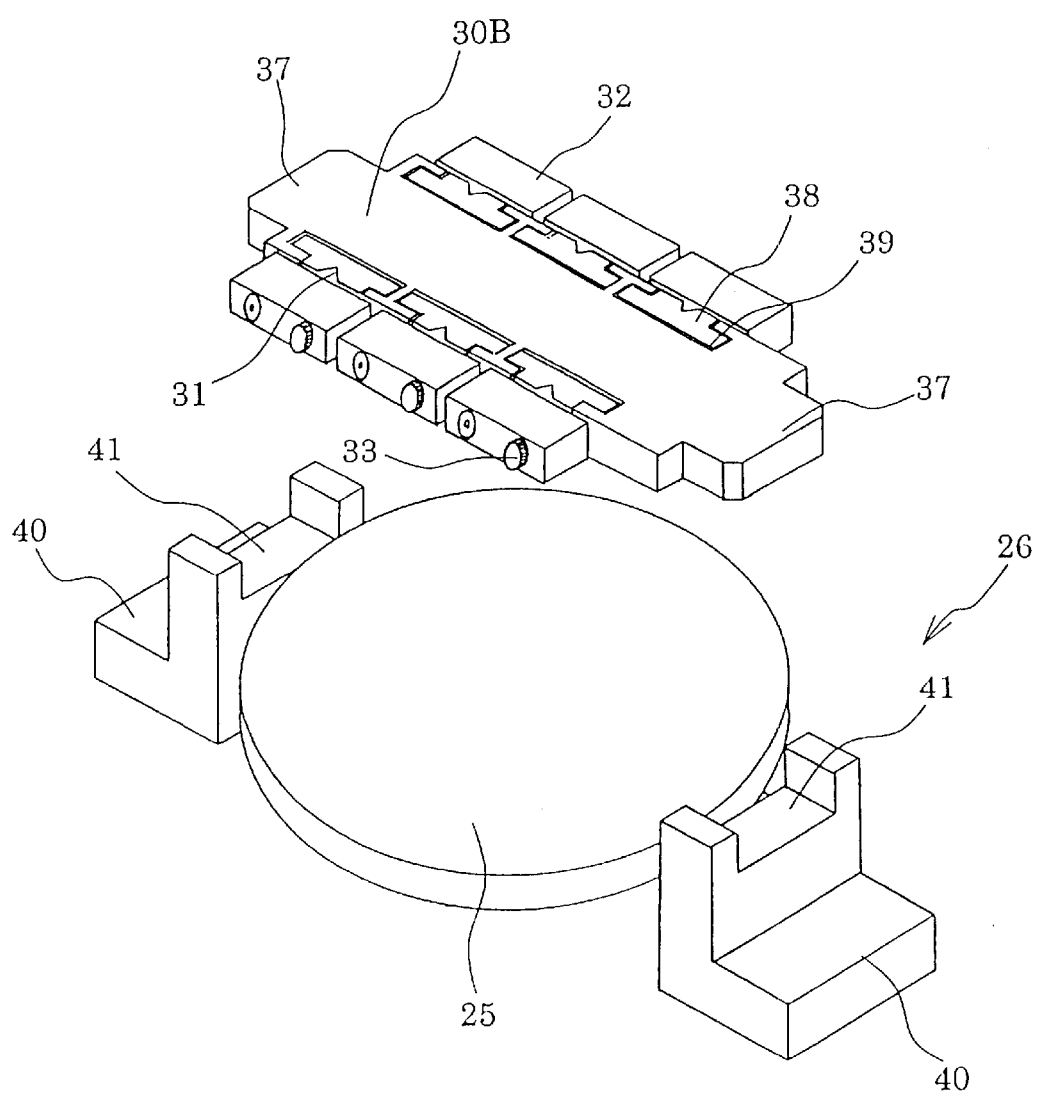
FIG. 6 is a schematic perspective view of a jig plate and a polishing plate according to other embodiments of this invention.

Such an example is shown in FIG. 6. Further, FIG. 6 shows a perspective view of a jig plate and a support mechanism according to another embodiment of this invention. Further, members that have similar functions as those in the embodiment described above have the same reference numerals and explanation is omitted.

As shown in FIG. 6, a jig plate 30B of this embodiment is rectangular in shape, and on the side surfaces of the opposing surfaces are provided a pair of sliding portions 38 held movably in the vertical direction, and mounting pieces 32 are fixed to the sliding portions 38. In more detail, by inserting the slide portions 38 into through holes 39 penetrated in the thickness direction, which are provided on the jig plate 30B and shaped similar to the slide portions 38, the slide portions 38 are held movable in the vertical direction in a state that the rotation direction movement of the slide portions 38 is restricted. Further, on one side of the slide portion 38 is formed V grooves 31 for sandwiching and holding the rod-shaped member W, and the rod-shaped member W may be fixed between the slide portion 38 and the mounting piece 32.

Further, similar to the above Embodiment 2, the support mechanism 26 of this embodiment is a pair of base stands 40, and by engaging the narrow width portions 37 provided on both ends in the longitudinal direction of the jig plate with the engaging grooves 41 provided on the base stand 40, the movement in the rotation direction of the jig plate 30B may be restricted.

With such a structure, the rod-shaped member W is held movable in the vertical direction by the holding mechanism comprised of the fixed slide portions 38 and the mounting pieces 32, and is held on the polishing plate 25 by the tip face of the rod-shaped member W, so that the own weight of the slide portions 38 and the mounting pieces 32 are on the rod-shaped member W. By polishing in this state, polishing can be carried out similarly to the above Embodiments 1 and 2. Further, with this structure, since the slide portions and the mounting pieces for fixing each of the rod-shaped members W are provided independently, even in a case where there is only one rod-shaped member W, polishing may be carried out without deteriorating the polishing accuracy.

The jig plate 30B may be fixed to the support mechanism 26, and further, may be a structure similar to Embodiment 1, such that it is fixed to the support shaft 28.

As described in detail in the embodiments, in the end face polishing apparatus of this invention, the jig plate is supported movably in the vertical direction in a state that the movement of the rotation direction is restricted, therefore the polishing of the rod-shaped member fixed to the jig plate is carried out by the own weight of the jig plate. Accordingly, the rod-shaped member may be polished always with a constant load without interfering with the progress of the polishing of the rod-shaped member by conducting mechanical adjustments, thereby improving the polishing accuracy of the end face of the rod-shaped member. Further, since the polishing amount is proportional to the polishing time, the polishing accuracy and the polishing time may be easily managed.

What is claimed is:

1. An end face polishing apparatus comprising: a jig plate for supporting at least one rod-shaped member; a polishing plate mounted for undergoing revolving and rotating movement; a polishing member mounted on the polishing plate for undergoing revolving and rotating movement therewith to polish an end face of the rod-shaped member; and supporting means for supporting the jig plate to undergo movement in the vertical direction and prevent rotation of the jig plate relative to the polishing member.

2. An end face polishing apparatus according to claim 1; wherein the jig plate has a peripheral portion and a mounting portion for mounting the rod-shaped member on the peripheral portion.

3. An end face polishing apparatus according to claim 2; wherein the jig plate has a through-hole; and wherein the support mechanism has a support shaft having one end disposed in the through-hole of the jig plate for movement therewith.

4. An end face polishing apparatus according to claim 3; wherein the support shaft engages the through-hole of the jig plate so that rotation of the jig plate relative to the support shaft is prevented.

5. An end face polishing apparatus according to claim 4; wherein the jig plate has a removable engaging portion for engaging the support shaft.

6. An end face polishing apparatus according to claim 3; wherein the jig plate has a removable engaging portion for engaging the support shaft.

7. An end face polishing apparatus according to claim 6; wherein the engaging portion has a through-hole; and wherein the support shaft has an end disposed in the through-hole of the engaging portion.

8. An end face polishing apparatus according to claim 6; wherein the engaging portion has a recessed groove formed in a surface thereof; and wherein the support shaft has an end disposed in the recessed groove of the engaging portion.

9. An end face polishing apparatus according to claim 2; wherein the jig plate has a central recessed groove; and wherein the support mechanism has a support shaft having one end disposed in the recessed groove of the jig plate for movement therewith.

10. An end face polishing apparatus according to claim 2; wherein the jig plate is supported by the support mechanism for undergoing movement in a vertical direction toward the polishing member.

11. An end face polishing apparatus according to claim 1; wherein the jig plate has a mounting portion for mounting the rod-shaped member and for undergoing movement in the vertical direction.

12. An end face polishing apparatus according to claim 1; further comprising a support mechanism for supporting the jig plate to undergo movement in the vertical direction.

13. An end face polishing apparatus according to claim 1; further comprising supporting means for supporting the jig plate to undergo movement in the vertical direction and prevent rotation of the jig plate relative to the polishing member.

14. An end face polishing apparatus according to claim 1; wherein the at least one rod-shaped member comprises a plurality of rod-shaped members.

15. An end face polishing apparatus according to claim 1; wherein the jig plate has a removable engaging portion; and further comprising a support mechanism for engagement with the engaging portion of the jig plate to support the jig plate.

16. An end face polishing apparatus according to claim 15; wherein the engaging portion has a through-hole; and wherein the support mechanism has a support shaft having one end disposed in the through-hole of the engaging portion.

17. An end face polishing apparatus according to claim 15; wherein the engaging portion has a recessed groove formed in a surface thereof; and wherein the support mechanism has a support shaft having one end disposed in the recessed groove of the engaging portion.

18. An end face polishing apparatus according to claim 17; wherein the recessed groove of the engaging portion receives the end of the support shaft so that during movement of the support shaft a preselected pressure is applied to the engaging portion by the support shaft.

19. An end face polishing apparatus comprising: a jig plate for supporting at least one workpiece having an end face; a polishing member for polishing the end face of the workpiece; and a support mechanism for supporting the jig plate to undergo movement in a direction toward the polishing member and prevent rotation of the jig plate relative to the polishing member.

20. An end face polishing apparatus according to claim 19; wherein the at least one workpiece comprises a plurality of workpieces.

21. An end face polishing apparatus according to claim 19; further comprising a polishing plate for supporting the polishing member, and supporting means for supporting the polishing plate to undergo revolving and rotating movement relative to the jig plate to polish the end face of the workpiece when the end face of the workpiece is in pressure contact with the polishing member.

22. An end face polishing apparatus according to claim 19; wherein the support mechanism comprises a support arm portion and a support shaft having a first end connected to the support arm portion and a second end opposite the first end and connected to the jig plate to prevent rotation of the jig plate relative to the polishing member.

23. An end face polishing apparatus according to claim 22; wherein the jig plate has a central through-hole; and wherein the second end of the support shaft is disposed in the central through-hole of the jig plate.

24. An end face polishing apparatus according to claim 23; further comprising a boss member connected to the jig plate and having a central through-hole concentric with the through-hole of the jig plate; and wherein the support shaft extends through the through-hole of the boss member.

25. An end face polishing apparatus according to claim 22; wherein the jig plate has a recessed groove disposed at a central portion thereof; and wherein the second end of the support shaft is disposed in the recessed groove of the jig plate.

* * * * *